United States Patent Office 3,367,969
Patented Feb. 6, 1968

3,367,969
PROCESS FOR THE PREPARATION OF
4,4'-METHYLENEDIANILINE
Gilbert Thornton Perkins, Landenberg, Pa., assignor to
E. I. du Pont de Nemours and Company, Wilmington,
Del., a corporation of Delaware
No Drawing. Filed Mar. 8, 1965, Ser. No. 438,072
2 Claims. (Cl. 260—570)

ABSTRACT OF THE DISCLOSURE

The present invention is directed to a new and improved process for the manufacture of 4,4'-methylenedianiline wherein significantly improved yields are obtained by reacting aniline hydrochloride with formaldehyde and thereafter adding additional amounts of aniline prior to the second, rearrangement, step.

---

4,4'-methylenedianiline is a chemical compound which has become of great industrial importance, particularly as an intermediate for the corresponding diisocyanate, 4,4'-methylene bis(phenylisocyanate), which is used for the production of polyurethanes. Because of the commercial importance of this material, considerable effort has been devoted in recent years to effect significant economies in its manufacture.

The general method employed for the production of 4,4'-methylenedianiline consists of adding aniline to hydrochloric acid to form aniline hydrochloride, condensing the aniline salt with formaldehyde at a relatively low temperature, generally below 40° C., then rearranging the condensation product to 4,4'-methylenedianiline by heating at a temperature of about 60 to about 100° C.

It is customary to employ a mole ratio of aniline/formaldehyde of about 3. However, U.S. Patent 2,818,433 describes a process wherein the yield of methylenedianiline is improved by using greater ratios of aniline to formaldehyde, preferably ratios of about 6. While this process gives an improved yield, the purity of the final product, as indicated by its freezing point, tends to decline with the increased aniline/formaldehyde ratios.

It has now been discovered that improved yields of high quality 4,4'-methylenedianiline can be obtained by reacting aniline hydrochloride with formaldehyde and thereafter adding additional amounts of aniline prior to the second, rearrangement, step.

The present invention may be defined as follows:

(1) Reacting formaldehyde with from 1.5 to 6, (preferably from 2 to 5) moles of aniline per mole of formaldehyde in the presence of from 0.25 to 1.1 (preferably from 0.95 to 1.05) moles of hydrochloric acid per mole of aniline, at a temperature in the range between about 20° C. and about 50° C. (preferably from about 30° C. to about 40° C.) for a time sufficient to substantially complete the reaction, and thereafter (2) Adding at least 0.1 and preferably 0.5 mole of free aniline with the proviso that the final composition contains from about 2 to about 10 and preferably from about 2.5 to about 5, moles of aniline per mole of formaldehyde and from about 0.1 to 0.98, and preferably from about 0.75 to 0.95 mole of hydrochloric acid per mole of aniline and thereafter (3) Heating the mixture obtained by Step 2 to a temperature from about 50 to about 100° C. preferably from 65 to 90° C. for a time sufficient substantially to complete the reaction; and (4) Recovering 4,4'-methylenedianiline.

In the foregoing definition of this invention, the amounts referred to are the amounts of reactants added to the reaction vessel regardless of whether or not they have combined or reacted.

The reaction may be conducted in any suitable vessel and may be run by a continuous or batch process.

The reaction can be performed at atmospheric pressure, but higher or lower pressures may be employed at the convenience of the operator.

The time required for the first reaction step varies from about 10 minutes to about 1 hour.

The additional free aniline can be added at any time after the reaction of Step 1 is substantially complete, but the preferred method is to add the aniline immediately before raising the temperature to achieve the rearrangement reaction of Step 3.

The rearrangement reaction which takes place in Step 3 is substantially completed in about 2 hours at the highest temperature and in about 6 hours at the lowest temperature.

Hydrochloric acid and formaldehyde are most conveniently handled in the form of aqueous solutions, and such aqueous solutions can be employed in the practice of this invention. The reaction is conducted in the presence of a small amount of water, such as is supplied by the water in the reagents in order to keep the reaction mixture in a manageable liquid state.

The product is recovered from the reaction mixture after Step 3 in the conventional manner, that is by neutralization with an alkaline material, usually sodium hydroxide or sodium carbonate, separation of the aqueous and organic phases and distillation of the organic phase, usually under vacuum. During the distillation unreacted aniline and traces of water are first removed and then the 4,4'-methylenedianiline is separated from the higher boiling residues.

The yield also varies with the aniline/formaldehyde ratio employed, and with the ratio of aniline/hydrochloric acid. The ranges specified in the definition of this invention represent the optimum conditions to obtain good yields with good product quality. The essence of the present invention is the addition of part of the aniline in the form of free base after reaction in Step 1 has been substantially completed. Using a given aniline to formaldehyde ratio and hydrochloric acid to aniline ratio, the addition of free aniline to the reaction mass as described above effects a significantly improved yield of 4,4'-methylenedianiline when compared with the yield obtained by the prior art procedure, in which all of the aniline is added initially. In addition, because only part of the total aniline used is in the form of the hydrochloride, significant savings are realized in both the hydrochloric acid used and the alkaline materials needed to neutralize the reaction mass.

This invention is further illustrated by the following examples, which are not, however, intended to fully delineate the scope of this discovery.

EXAMPLES

In these examples the following general procedure is employed throughout:

Distilled aniline is added to a mixture of 37% hydrochloric acid in water. The amount of water, including that present in the aqueous HCl, is equal to the weight of aniline added. Formaldehyde is added as a 37% aqueous solution. The mixing is conducted at a temperature of 40° C. and this temperature is maintained while the reaction mixture is stirred for one-half hour. Free aniline is then added and the temperature is raised to 65° C. and held at this temperature for three hours. The reaction mass is neutralized with the required amount of sodium hydroxide. The organic and aqueous phases are separated, and the organic phase is fractionated by distillation under vacuum, first to remove excess aniline and water, and then to remove methylenedianiline from the high boiling residue.

The yield is calculated from the formula:

$$\frac{\text{weight of methylenedianiline obtained}}{\text{weight of methylenedianiline} + \text{weight of residue}} \times 100$$

For purposes of comparison, the following runs were made using the prior art process in which all of the aniline is added initially, but otherwise using the conditions stated hereinabove. The results obtained by this prior art process is shown in Tables A and B. In Table A the yield and freezing point of 4,4'-methylenedianiline is shown using an initial aniline/formaldehyde molar ratio of 3.0 in each case, and varying the molar ratio of hydrochloric acid to aniline from 0.33 to 1.01. From Table A it can be seen that the optimum yield and product quality are obtained by a ratio of hydrochloric acid to aniline of about 0.77 to 0.95. Table B shows the effect of varying mole ratios of aniline/formaldehyde in the prior art process using the optimum mole ratio of hydrochloric acid to aniline of 0.95.

Product quality is shown by the freezing point of the product. As usually prepared, 4,4'-methylenedianiline contains a small amount of 2,4'-methylenedianiline which lowers the freezing point of the product. A freezing point of 90.5° C. indicated that the product contains at least 96% of the 4,4'-isomer.

TABLE A

| Run | Mole Ratio | | Yield, Percent | F.P.,[1] ° C. |
|---|---|---|---|---|
| | Aniline/ Formaldehyde | Hydrochloric/ Aniline | | |
| 1 | 3.0 | 0.33 | 67.8 | 84.0 |
| 2 | 3.0 | 0.50 | 77.0 | 88.1 |
| 3 | 3.0 | 0.65 | 79.4 | 89.6 |
| 4 | 3.0 | 0.77 | 83.2 | 90.3 |
| 5 | 3.0 | 0.85 | 83.4 | 90.9 |
| 6 | 3.0 | 0.95 | 85.3 | 90.9 |
| 7 | 3.0 | 0.99 | 80.9 | 90.5 |
| 8 | 3.0 | 1.01 | 78.3 | 88.8 |

[1] Freezing Point of Product.

TABLE B

| Run | Mole Ratio | | Yield, Percent | F.P.,[1] ° C. |
|---|---|---|---|---|
| | Aniline/ Formaldehyde | Hydrochloric/ Aniline | | |
| 1 | 2.5 | 0.95 | 79.8 | 91.4 |
| 2 | 3.0 | 0.95 | 85.3 | 90.8 |
| 3 | 4.0 | 0.95 | 88.8 | 90.5 |
| 4 | 5.0 | 0.95 | 90.5 | 90.1 |
| 5 | 6.0 | 0.95 | 91.2 | 89.7 |

[1] Freezing Point of Product.

*Example I*

In this example the molar ratio of aniline to formaldehyde used in the initial condensation (Step 1 of the definition of invention) is maintained at 3:1 and the hydrochloric acid to aniline ratio is maintained at 1.01:1. In each run free aniline is added just before the temperature is increased to effect the rearrangement reaction (Step 3 of the definition of invention) to give the aniline/formaldehyde and the aniline/hydrochloric acid molar ratios shown in Table I, which also show the yields and freezing points of the products obtained.

For comparison there is shown the yields of 4,4'-methylenedianiline obtained by the prior art procedure of adding all of the aniline to the formaldehyde in the initial step, at the optimum hydrochloric acid to aniline mole ratio of 0.95 but using the ratio of aniline to formaldehyde described for Step 3 in the process of the present invention. It will be noted that the yield obtained by the present invention is in each case superior to that of the prior art, although substantially less hydrochloric acid is employed in the present invention.

TABLE I

| Run | Mole Ratios After Addition of Free Aniline Before Step 3 | | Yield, Percent | | F.P., ° C. |
|---|---|---|---|---|---|
| | Aniline/ Formaldehyde | Hydrochloric acid/ aniline | This Invention | Comparison | |
| 1 | 3.30 | 0.92 | 87.0 | 86.4 | 91.2 |
| 2 | 3.56 | 0.85 | 89.1 | 87.3 | 90.7 |
| 3 | 3.79 | 0.80 | 89.6 | 88.1 | 90.3 |
| 4 | 4.06 | 0.75 | 90.1 | 88.9 | 90.2 |
| 5 | 4.66 | 0.65 | 91.6 | 89.9 | 89.8 |
| 6 | 6.06 | 0.50 | 92.4 | 91.2 | 88.0 |

When Run 4 of this example is repeated, except that after free aniline is added the reaction mass is heated an hour at 50° C., one hour at 65° C. and one hour at 90° C., the yield is 90.4% and the product has a freezing point of 90.3° C.

*Example II*

In this example the ratio of aniline to formaldehyde used in Step 1 is varied from 2.5 to 5. In each run the ratio of HCl to aniline in Step 1 is 1.01 and in Step 3 is 0.85. The yields and freezing points are shown in Table II. Comparison of yields with a conventional process is made in the same way as in Example I.

Similar results are obtained when the experiment is repeated except that Step 1 is carried out at 20° C. instead of 40° C.

TABLE II

| Run | Aniline/Formaldehyde, mole ratio | | Yield, percent | | F.P., ° C. |
|---|---|---|---|---|---|
| | Step 1 | Step 3 | Process of This Invention | Comparison | |
| 1 | 2.5 | 2.98 | 86.6 | 85.1 | 91.1 |
| 2 | 3.0 | 3.56 | 89.1 | 87.3 | 90.7 |
| 3 | 4.0 | 4.75 | 92.0 | 90.1 | 90.2 |
| 4 | 5.0 | 5.96 | 94.0 | 91.2 | 90.0 |

*Example III*

This experiment is carried out as described in Example I using the aniline to formaldehyde and HCl to aniline ratios shown in Table III. While the conditions of this experiment do not give the optimum yields possible within the scope of this invention, this experiment illustrates that, for given ratios of aniline to formaldehyde and HCl to aniline, there is a definite advantage in yield obtainable by adding a portion of the aniline as free base between Step 1 and Step 3.

TABLE III

Mole ratio aniline/formaldehyde:
　Step 1 _____ 2.25
　Step 3 _____ 3.0
Mole ratio hydrochloric acid/aniline:
　Step 1 _____ 0.44
　Step 3 _____ 0.33
Yield percent _____ 74
Run 1, Table A _____ 67.8

*Example IV*

This example illustrates a continuous process. The reactants are fed continuously into a stirred vessel from which the reactants flow through a 150-ft. length of coiled polyethylene tubing (inside diameter 3/8 inch) immersed in a water bath. Step 1 takes place in the stirred vessel and Step 3 takes place in the polyethylene tubing. Additional aniline is introduced into the polyethylene tubing at a point near its beginning (that is, between Step 1 and Step 3). The residence times are one-half hour and 4 hours, respectively in the stirred vessel and the polyethylene tubing. The molar ratios of materials used are as follows.

Aniline:CH₂O:
  Step 1 ———————————————————— 3.0
  Step 3 ———————————————————— 4.06
HCl:aniline:
  Step 1 ———————————————————— 1.01
  Step 3 ———————————————————— 0.75

The product is recovered as described in Example I. The yield of 4,4'-methylenedianiline is 92.1% and the product has a freezing point of 90.3° C. Comparison with the yield obtained in a similar batch process (90.1% in Run 4 of Table I) shows that an even better yield is obtained in the continuous process. Similar results are obtained when the polyethylene tubing is immersed in three baths in series so that the heating during the rearrangement is in three stages as follows:

1.25 hours at 50° C.
1.25 hours at 65° C.
1.5 hours at 90° C.

I claim:
1. A process for the preparation of 4,4'-methylenedianiline which comprises:
   (I) reacting formaldehyde with from 1.5 to 6 moles of aniline per mole of formaldehyde in the presence of from 0.25 to 1.1 moles of hydrochloric acid per mole of aniline, at a temperature in the range between about 20° C. and about 50° C. for a time sufficient to substantially complete the reaction, and thereafter
   (II) adding at least 0.2 mole of free aniline with the proviso that the final composition contains from about 2 to about 10 moles of aniline per mole of formaldehyde and from 0.1 to 0.98 mole of hydrochloric acid per mole of aniline and thereafter
   (III) heating the mixture obtained by Step II to a temperature from about 50° C. to about 100° C. for a time sufficient substantially to complete the reaction, and
   (IV) recovering 4,4'-methylenedianiline.

2. A process for the production of 4,4'-methylenedianiline which comprises:
   (I) reacting formaldehyde with from 2 to 5 moles of aniline per mole of formaldehyde in the presence of from 0.95 to 1.05 moles of hydrochloric acid per mole of aniline at a temperature in the range between 20° and 50° C. for a time sufficient to substantially complete the reaction, and thereafter
   (II) adding at least 0.5 mole of free aniline with the proviso that the final composition contains from about 2.5 to about 5 moles of aniline per mole of formaldehyde and from about .77 to 0.95 mole of hydrochloric acid per mole of aniline, and thereafter
   (III) heating the mixture obtained by Step II to a temperature from about 50 to about 100° C. for a time sufficient substantially to complete the reaction.

References Cited
UNITED STATES PATENTS

| | | | |
|---|---|---|---|
| 2,818,433 | 12/1957 | Erickson | 260—570 |
| 3,260,750 | 7/1966 | Powers et al. | 260—570 |
| 3,277,173 | 10/1966 | Powers et al. | 260—570 |

CHARLES B. PARKER, *Primary Examiner.*

R. V. HINES, *Assistant Examiner.*